United States Patent [19]

LaBudde

[11] Patent Number: 5,091,900
[45] Date of Patent: Feb. 25, 1992

[54] MULTI-LAYER OPTICAL MEDIA FOR AN OPTICAL RECORDING AND REPRODUCING SYSTEM IN WHICH NON-ABLATIVE DATA RECORDING IS PROVIDED IN A MANNER SUCH THAT HIGH SENSITIVITY IS ACHIEVED WITH AN IN-CONTACT OVERCOAT

[75] Inventor: Edward V. LaBudde, Newbury Park, Calif.

[73] Assignee: Unisys Corp., Detroit, Mich.

[21] Appl. No.: 458,426

[22] Filed: Jan. 17, 1983

Related U.S. Application Data

[63] Continuation-in-part of Ser. No. 319,407, Nov. 9, 1981, abandoned.

[51] Int. Cl.$^5$ .......................... G11B 7/00; G11B 7/24
[52] U.S. Cl. .................... 369/100; 369/275.1; 369/284
[58] Field of Search .................. 369/100, 109–112, 369/120–123, 283–286, 288–275, 275.1, 275.5; 346/76 C, 108, 135.1; 365/106, 109–113, 120, 124, 127, 215; 430/348, 502, 495–496, 945, 961, 64, 65, 132; 428/913; 358/342; 427/250, 304, 357, 358

[56] References Cited

U.S. PATENT DOCUMENTS

| 4,268,575 | 5/1981 | Shinozaki et al. | 346/76 L |
| 4,282,534 | 8/1981 | Shinozaki et al. | 346/135.1 |
| 4,285,056 | 8/1981 | Bell | 369/100 |
| 4,335,198 | 6/1982 | Hamada et al. | 346/76 L |
| 4,408,213 | 10/1983 | Bell | 346/135.1 |
| 4,451,914 | 5/1984 | LaBudde et al. | 369/275 |
| 4,451,915 | 5/1984 | LaBudde et al. | 369/275 |

OTHER PUBLICATIONS

Harri et al, "Continuous Wave Laser Recording on Metallic Thin Film", Image Technology, Apr./May 1970, pp. 31–35.
Ahn et al, IBM Technical Disclosure Bulletin (Jan. 83), vol. 25, No. 8, pp. 4200–4202.
Doremus, Journal of Applied Physics (Jun. 1966) vol. 37, No. 7, pp. 2775–2781.
Bartolini, Optical Engineering (May/Jun. 81), vol. 20, No. 3, pp. 382–386 (reprint of Jan./Feb. 81 article).
Cohen, Applied Physics Lett. (Jun. 80) vol. 36, No. 12, pp. 950–952.

Primary Examiner—Aristotelis M. Psitos
Assistant Examiner—Steven R. Garland
Attorney, Agent, or Firm—Nathan Cass; Mark T. Starr

[57] ABSTRACT

A novel optical media is provided for use in an optical recording and reproducing system. The optical media comprises a tuned multilayer optical structure employing an archival thin film absorber having a relatively high melting point, such as gold, along with an in-contact overcoat. The characteristics of the media are chosen so as to permit use of a specially chosen hole-forming data recording mechanism which permits recording optically detectable data in the media without requiring heating of the absorber material to its bulk melting point, and also without requiring ablation of the absorber material, whereby compatibility with the in-contact overcoat is also achieved.

11 Claims, 2 Drawing Sheets

MULTI-LAYER OPTICAL MEDIA FOR AN OPTICAL RECORDING AND REPRODUCING SYSTEM IN WHICH NON-ABLATIVE DATA RECORDING IS PROVIDED IN A MANNER SUCH THAT HIGH SENSITIVITY IS ACHIEVED WITH AN IN-CONTACT OVERCOAT

This patent application is a continuation-in-part of the commonly assigned, copending patent application Ser. No. 319,407, filed Nov. 9, 1981, abandoned.

BACKGROUND OF THE INVENTION

The present invention relates generally to improved means and methods for providing for the recording and reproducing of data in an optical recording and reproducing system, and more particularly to improved optical media for use therein.

In recent years considerable effort has been expended to develop improved methods and apparatus for optically recording and reading data because of the unusually high recording density potential offered by optical recording. In a typical system, a writing laser beam of appropriate frequency is focused upon a recording medium with sufficient intensity to cause an optically detectable change to be produced at the region of incidence of the focused spot. Data is recorded by appropriately modulating the intensity of the writing laser beam with the data to be recorded, while providing for relative movement between the medium and the focused light spot, thereby producing an optically detectable data pattern in the medium. Reading of this recorded data pattern is typically accomplished using a reading laser beam of constant intensity and appropriate frequency having an intensity level which will not disturb the integrity of the recorded data. Detecting apparatus positioned to receive the reflected reading beam produces an electrical signal representative of the recorded data.

Examples of various optical memory apparatus and optical media are contained in the following patents, publications and the references cited therein.

| U.S. PATENT DOCUMENTS | | |
|---|---|---|
| U.S. Pat. No. | Date Issued | Inventor(s) |
| 4,216,501 | 8/5/80 | Bell |
| 4,222,071 | 9/9/80 | Bell, et al. |
| 4,232,337 | 12/4/80 | Winslow, et al. |
| 4,243,848 | 1/6/81 | Utsumi |
| 4,243,850 | 1/6/82 | Edwards |
| 4,253,019 | 2/24/81 | Opheij |
| 4,253,734 | 3/3/81 | Komurasaki |
| 4,268,745 | 5/19/81 | Okano |

PUBLICATIONS

R. A. Bartolini et al "Optical Disk Systems Emerge", IEEE Spectrum, August 1978, pp. 20-28.

G. C. Kenney, et al., "An Optical Disk Replaces 25 Mag Tapes", IEEE Spectrum, February 1979, pp. 33-38.

K. Bulthuis, et al., "Ten Billion Bits on a Disk", IEEE Spectrum, August 1979, pp. 26-33.

A. E. Bell, et al., "Antireflection Structures for Optical Recording", IEEE Journal of Quantum Electronics, Vol. QE-14, No. 7, July 1978, pp. 487-495.

R. A. Bartolini, "Optical Recording: High-Density Information Storage and Retrieval", IEEE Proceedings, Vol. 70, No. 6, June 1982, pp. 589-597.

The pertinent portions of the above subject matter are hereby incorporated herein.

It will be evident from the above that the choice of the optical recording media is a primary consideration in the design of an optical memory system. Known optical media are deficient in various respects and the search continues for improved media. However, this search is a most difficult one and is compounded by the fact that reliable predictability is not possible because all of the mechanisms involved in high density laser recording in thin film optical media are not fully understood.

SUMMARY OF THE PRESENT INVENTION

It is the primary object of the present invention to provide improved optical media for use in an optical recording and reproducing system.

In a particular preferred embodiment of the invention a novel optical media is provided comprising a tuned optical structure employing an archival thin metal film absorber layer, such as gold, and an in-contact overcoat. The characteristics of this media are chosen to be such that a non-ablative type of hole-forming mechanism can be employed for recording optically detectable data in the archival thin metal film in a manner which makes it possible to achieve significantly improved performance of the media when used in an optical recording and reproducing system even in the presence of the in-contact overcoat.

The specific nature of the invention as well as other objects, advantages, features and uses thereof will become evident from the following detailed description and the accompanying drawings.

DESCRIPTION OF PREFERRED EMBODIMENTS

Figure 1:
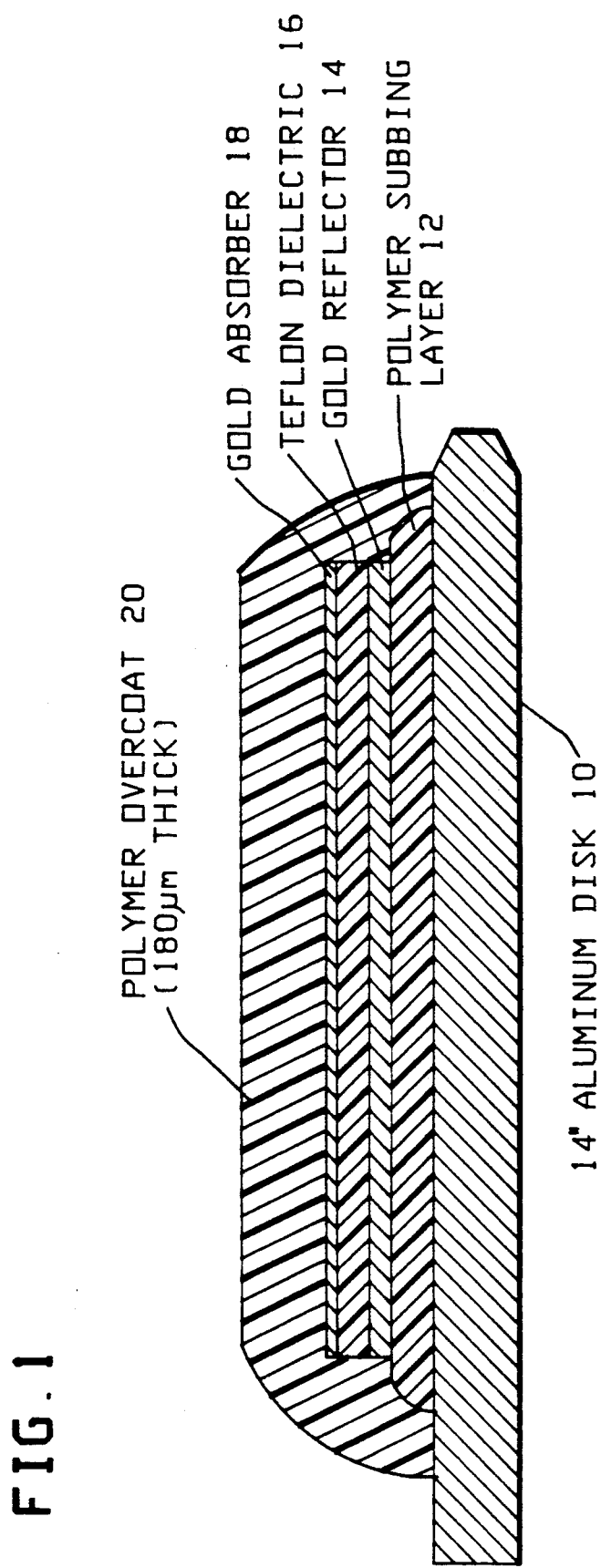
FIG. 1 is a cross-sectional view illustrating the basic structure of an optical recording and reproducing disk in accordance with the invention.

In a preferred embodiment, the media design concept involves the use of an optical structure employing a variety of layers each in intimate contact with one another and without air spaces. The overall disk structure is shown in FIG. 1. The baseline mechanical approach involves using, for example, a standard Winchester 14" aluminum substrate 10 as the supporting mechanical structure. The additional thin film layers are coated on the aluminum substrate which includes a polymer subbing layer 12, the optical layers consisting of a gold reflector 14, a Teflon dielectric spacer 16, a thin film gold absorber 18, and a relatively thick polymer overcoat 20 encapsulating the other layers. The following is a short discussion of the material characteristics of each of these layers.

Aluminum substrate

The use of an aluminum disk 10 as the substrate is preferred because it can be provided with a high degree of flatness and also has the ability to withstand environmental requirements along with rotation at high speeds. However, the surface smoothness of aluminum is not of sufficient quality to achieve optical flatness, even using diamond turning techniques. The polymer subbing layer 12 is thus provided.

Polymer subbing layer

A relatively thin polymer subbing layer 12 is spin-coated onto the surface of the aluminum disk 10 and cured with an ultra violet light. The purpose of the polymer subbing layer 12 is to provide an optically flat surface of low roughness on the aluminum disk 10 as well as good environmental durability.

Optical layers

The three optical layers 14, 16 and 18 are deposited on the aluminum disk 10 with subbing layer 12 so as to form a tuned optical network. The first layer 14 deposited is a relatively thick gold reflector layer of typically 200 to 400 Angstroms. On top of the gold reflecting layer 14 is a fluorinated hydrocarbon polymer quarter-wave spacer 16, such as Teflon, which is used to tune the structure to achieve a minimum reflectance with the gold absorber layer 18 which is deposited on top of the dielectric spacer layer 16. The gold absorber layer typically has a thickness of 20–60 Angstroms and the spacer layer is typically about 1000 Angstroms. The combination of the absorber layer 18, dielectric spacer 16, and gold reflector 14 provide an optically tuned network which has a minimal reflectance at the desired wavelength, which is typically 633 nanometers to permit use with a 633 nanometer helium neon wavelength laser.

In the preferred embodiment, the overall structure is chosen to achieve extremely good archival qualities. The use of a gold reflector 12 with a gold absorber 18 is advantageous in that it reduces the possibility of electrolytic action that contamination may create and minimizes corrosion problems. The use of a fluorinated hydrocarbon polymer dielectric material, such as Teflon, for the spacer layer 16 further enhances the archival performance as it is a high temperature, very rugged, organic material which does not absorb a significant amount of moisture.

Polymer overcoat

After deposition of the three optical layers 14, 16 and 18, a relatively thick polymer overcoat 20 is coated over the overall disk 10, preferably overlapping the sides of the layers and extending to the surface of the aluminum disk 10, as shown in FIG. 1. This polymer overcoat 20 is preferably dispensed while rotating at low speeds, and is cured by ultra violet lamps. The major requirements for the polymer overcoat 20 are mechanical compatibility to ensure environmental performance, and compatibility with the hole-forming mechanism so that there is no significant decrease in performance after the overcoat is applied.

The primary function of the overcoat layer 20 is to keep dust particles out of focus from the media surface. A thickness of about 180 microns is suitable based upon the need for maintaining a relatively small thickness tolerance (on the order of 10 to 15 microns) with sufficient thickness to insure protection against relatively large dust particles.

Hole forming mechanism

The hole forming mechanism employed for recording optically detectable data in media such as illustrated in FIG. 1 involves neither ablation (removal of material from the hole) nor rim formation. Rather, it is a process of melting and agglomeration of the absorber layer material 18 to form a specific debris configuration in which the optical losses are relatively low. An important consequence of the mechanism is that the hole forming process may take place, relatively unimpeded, in the presence of a hard, in-contact overcoat, such as 20 in FIG. 1. These features of the hole forming process are achieved by depositing the gold absorber layer 18 as an island film with particular characteristics (to be considered later on herein), rather than as a continuous film. An important advantage of the use of such an island film for the absorber layer 18 is that it essentially eliminates radial conductivity as a thermal loss mechanism, thereby permitting the use of relatively high melting point materials (such as gold and other noble metals) for the absorber layer 18.

Considering the hole forming mechanism in more detail, as the gold island film 18 is exposed to the write laser, energy is absorbed and the temperature of the islands rises until a critical (threshold) temperature is reached. At this critical temperature, which typically ranges from 300° C. to 600° C. (well below the temperature of bulk gold), a melting event takes place in the islands which, in a microscopic sense, causes movement of material at a molecular level to a new size and shape. More specifically, this melting event is accompanied by a change in shape of the islands from irregularly-shaped polyhedra to tiny spheres. The spherical shape is a result of inter-facial energy considerations between the now molten gold and the surface it is resting upon, and represents the minimum contact area case. A consequence of this shape change is a sudden "detuning" of the optical absorption of the optical cavity in the exposed region, effectively "quenching" the temperature rise.

While the absorber particles are still in the molten state, however, they migrate about their equilibrium positions colliding with other molten particles and bringing about a process of agglomeration of the individual spheres into a configuration of larger spheres distributed throughout the area of the written hole. The extent to which this agglomeration process can proceed is dependent upon the temperature achieved during the melting phase and the mobility of the molten particles. The distances over which this migration takes place during agglomeration is typically of the order of 300 to 400 Angstroms which is compatible with the use of the in-contact overcoat 20. Migration distances greater than about 500 Angstroms deleteriously affect media performance while distances greater than 1000 Angstroms provide inadequate performance.

The basic processes which are at play involve a critical temperature at which the optical property switches from one state to another so that two uniform optical refractive indexes are achieved for the absorber film 18. The refractive index of the unrecorded medium is a function of the deposition techniques and it is dependent on the island size and structure as well as on the laser recording wavelength. The islands are irregular and for a laser wavelength of 633 nanometers preferably have a maximum dimension and spacing in the 50 to 100 Angstrom range with an aerial coverage of about 60% to 80%. Although the effects of island size and spacing are wavelength dependent, using presently available laser wavelengths, values greater than 500 Angstroms for either the maximum dimension and/or spacing causes the performance of the media to deteriorate significantly, with values beyond 1000 Angstroms providing unacceptable performance. In addition, the influence of the tuning of the dielectric spacer 16 and the reflector 14 come into play to achieve an overall background reflectance on the disk which can be controlled to a close tolerance near 10% reflectance.

After laser recording in accordance with the invention, the index of refraction will be permanently altered by the coalescence at the molecular level of the absorber layer 18. The new index of refraction of the material, when coupled with the tuned optical cavity, produces a highly reflective surface which is perceivable as an optically detectable hole.

Observations of the written data bits show that the hole forming mechanism involves melting and agglomeration of the gold islands to form a distribution of spherical particles throughout the written hole area. None of the gold will have been ablated or ejected from the bit site due to the presence of the thin overcoat. The spherical particles in the written hole area typically range in diameter from 100 to approximately 350 Angstroms and the particle size distribution does not significantly change as a function of the write power at a constant pulse length. It has been discovered that the size and distribution of these particles as well as the laser recording wavelength are important factors in determining media performance. In particular, it has been discovered that, for currently available laser wavelengths, formation of particles greater than approximately 500 Angstroms in radius and/or having a spacing greater than approximately 500 Angstroms will be detrimental to the signal-to-noise ratio and bit error rate. A value of 1000 Angstroms appears to be an upper limit for both the radius and spacing in order to obtain adequate performance of the media. The optimum particle distribution should be chosen so as to produce large enough particles to get large optical change, yet small enough to prevent scattering and degradation of signal-to-noise ratio. Also, since the uniformity of the particles in the hole is a factor affecting media performance, the mass distribution of particles per square area in the hole should not have an irregularity of greater than about 25%.

A valuable aid which will be useful to one skilled in the art for practicing the present invention will now be described. It has been discovered that a very simple transfer function can be employed to indicate the overall performance of a media provided in accordance with the invention. More specifically, it has been discovered that the overall transfer function can be represented by a plot of $R = R_B + \Delta R$ versus $1/P$ for a given media, where $R_B$ is the background (unrecorded) reflectance of the media, $\Delta R$ is the change in reflectance produced by a written hole in the media, and P is the power of the writing laser beam. It has been found that such a plot is essentially a straight line, and furthermore, that the R intercept is indicative of the maximum reflectance change that can be obtained for a hole, while the $R = R_B$ intercept is indicative of the threshold power required to initiate the hole forming mechanism described herein.

Description of a Preferred Optical Recording and Reproducing System

Figure 2:
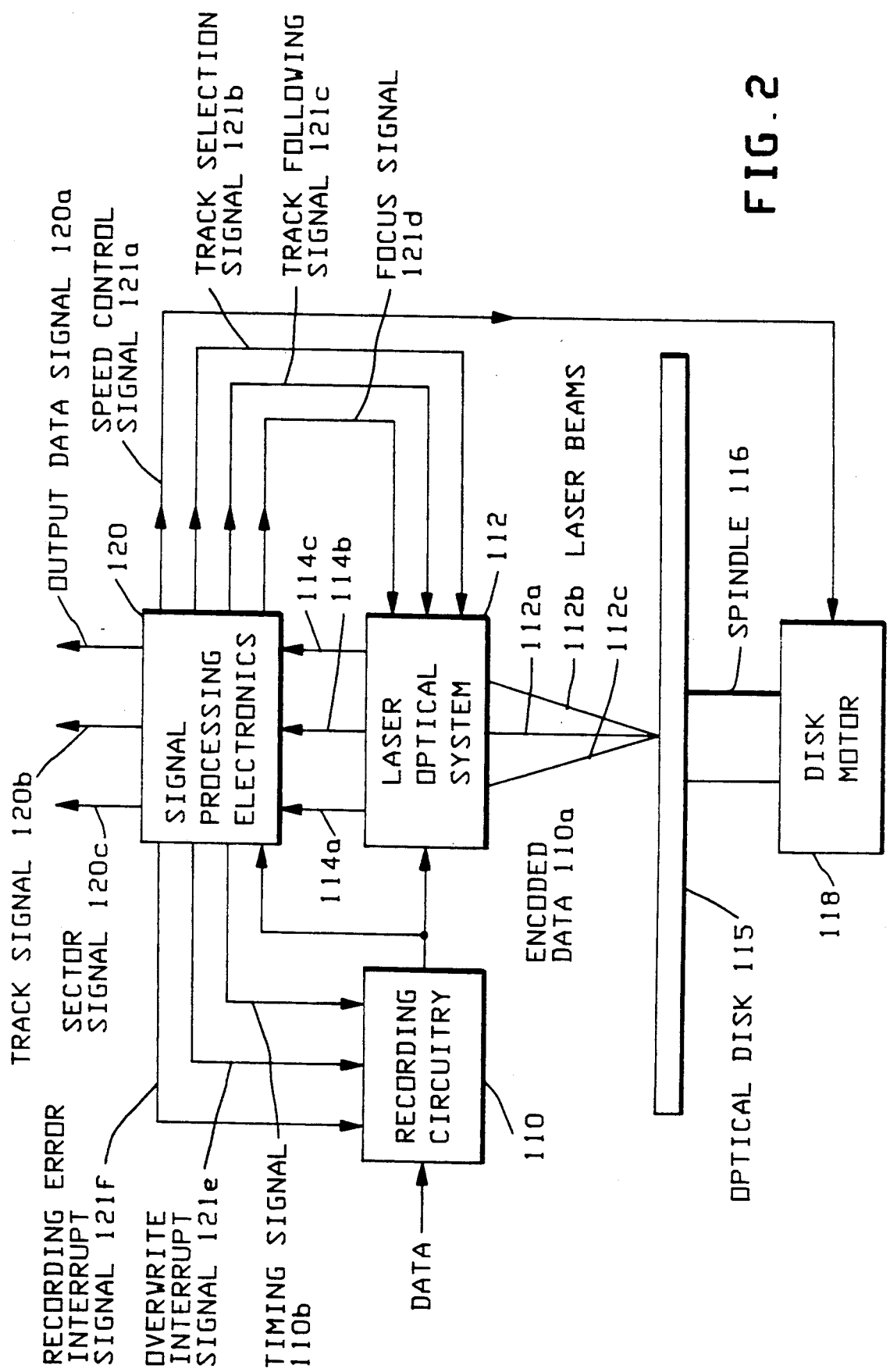
FIG. 2 is a block and schematic diagram of an optical recording and reproducing system incorporating the optical disk of FIG. 1.

Reference is next directed to FIG. 2, which generally illustrates the basic portions of a preferred embodiment of an optical recording and reading system in which the media disclosed herein can advantageously be employed. This system is discussed in further detail in the commonly assigned copending patent application Ser. No. 311,629, filed Oct. 15, 1981, now U.S. Pat. No. 4,494,226. The data to be recorded is first applied to recording circuitry 110 which encodes the applied data using, for example, a conventional encoding format of the type employed for magnetic recording, such as non-return-to-zero, return-to-zero, etc. Conventional error checking may also be provided for the encoded signal.

The encoded data 110a from the recording circuitry 110 is applied to a laser optical system 112 operating, for example, at a wavelength of 633 nanometers. The laser optical system 112 generates three laser beams 112a, 112b and 112c which are focused at spaced locations along the center line of the same selected track of optical disk 115 supported on a precision spindle 116 for rotation by a motor 18. The optical disk 115 comprises the structure illustrated in FIG. 1 having the characteristics previously described herein. Laser beam 112a is a writing beam which is modulated by the encoded data so as to form optically detectable holes in a selected track in the manner previously described herein. The writing beam typically has a diameter of 4000 to 10,000 Angstroms and a power of 10 to 12 milliwatts.

Laser beams 112b and 112c shown in FIG. 1 are reading beams. As typically illustrated in FIG. 2, the reading beam 112b is a read-after-write beam which is accordingly focused behind the writing beam 112a on the center line 117a of a selected track 117, while the reading beam 112b is a read-before-write beam and is accordingly focused ahead of the writing beam 112a. The intensity of the read beams 112b and 112c are chosen so that they will not disturb the integrity of previously recorded information. The read beams are reflected from the disk 115 back to the optical system 112 which, in response thereto, derives a plurality of detection signals 114a, 114b and 114c which are applied to signal processing electronics 120. The signal processing electronics 120 also receives the encoded data signal 110a from the recording circuitry 110 for use in checking the accuracy of recorded data.

The signal processing electronics 120 uses the detected signals 114a, 114b and 114c to provide an output data signal 120a corresponding to data read from the optical disk 115, along with signals 120b and 120c respectively identifying the track and sector locations on the disk from which the data is read. The signal processing electronics 120 also produces control signals 110b, 121a, 121b, 121c, 121d, 121e and 121f. More specifically, control signal 110b is applied to the recording circuitry 110 for synchronizing the encoding of data with disk rotation; control signal 121a is applied to the optical disk motor 118 to provide accurate speed control during recording and reading; control signal 121b is applied to the laser optical system 112 for controlling the radial position of the laser beams 112a, 112b and 112c for the purpose of selecting a desired track; control signal 121c is applied to the laser optical system 112 for providing precise track following of the laser beams on the selected track; control signal 121d is applied to the laser optical system 112 for providing precise focusing of the laser beams 112a, 112b and 112c; and control signal 121e is applied to the recording circuitry 110 for interrupting recording if the reflected read-before-write beam indicates the possibility of an overwrite recording error because the track ahead contains previously recorded data; and signal 121f is applied to the recording circuitry 110 to interrupt recording if a recording error occurs.

Although the description of the invention provided herein has been primarily directed to particular preferred embodiments of the invention, it is to be understood that many modifications in construction, arrangement, operation and use are possible without departing from the scope of this invention. The appended claims are accordingly intended to cover and embrace all such possible modifications and variations coming within the spirit and scope of the invention.

What is claimed is:

1. An optical medium for use in a high density digital data optical recording system employing a writing laser beam of predetermined wavelength for writing data on said medium, said medium comprising a plurality of layers including a reflective layer, a dielectric spacer layer overlying said reflective layer, an absorber layer overlying said spacer layer, and a hard in-contact overcoat layer overlying said absorber layer, the thicknesses and optical characteristics of said layers being chosen so that essentially a minimum reflectance condition is provided for said medium at said wavelength, said absorber layer being provided as a discontinuous gold island film comprised of microscopic irregular shaped polyhedra, and wherein optically detectable holes representative of high density digital data are provided in said medium, each hole being provided during relative movement between said laser beam and said medium as a result of a non-ablative hole forming mechanism which is initiatable in response to said writing beam being applied to said hole via said in-contact overcoat layer, the thickness of said film being such as to essentially eliminate radial conductivity as a thermal loss mechanism during formation of said hole, and said hole forming mechanism being such that a threshold temperature is reached in response to said beam which causes polyhedra in said hole to form spherical particles which migrate and agglomerate with each other so as to produce a microscopic debris configuration for said hole comprised of spaced agglomerated particles which are large enough to cause said hole to exhibit a relatively large optically detectable increase in reflection from said minimum reflectance condition yet small enough to prevent scattering and degradation of signal-to-noise ratio, said threshold temperature being well below the bulk melting temperature of gold and also being such that the distances over which said migration occurs is less than 500 Angstroms so that migration is not significantly impeded by said in-contact overcoat.

2. A method of storing high density digital data comprising the steps of:
providing an optical recording medium comprising a plurality of layers including a reflective layer, a dielectric spacer layer overlying said reflective layer, an absorber layer overlying said spacer layer, and a hard in-contact overcoat layer overlying said absorber layer, the thicknesses and optical characteristics of said layers being chosen so that essentially a minimum reflectance condition is provided for said medium at said wavelength, said absorber layer being provided as a discontinuous gold island film comprised of microscopic irregular shaped polyhedra, and
scanning said medium with a laser beam so as to form optically detectable holes in said medium representative of high density digital data, each hole being formed at a selected location as a result of a non-ablative hole forming mechanism which is initiatable in response to said laser beam being applied with writing intensity to said hole via said in-contact overcoat layer, the thickness of said film being such as to essentially eliminate radial conductivity as a thermal loss mechanism during formation of said hole, and said hole forming mechanism being such that a threshold temperature is reached in response to said beam which causes polyhedra in said hole to form spherical particles which migrate and agglomerate with each other so as to produce a microscopic debris configuration for said hole comprised of spaced agglomerated particles which exhibit a relatively large optically detectable increase in reflection from said minimum reflectance condition yet are small enough to prevent scattering and degradation of signal-to-noise ratio, said threshold temperature being well below the bulk melting temperature of gold and also being such that the distances over which said migration occurs is less than 500 Angstroms so that migration is not significantly impeded by said in-contact overcoat.

3. The invention in accordance with claim 1, or 2, wherein said gold film has a thickness of 20 to 60 Angstroms and said polyhedra have a maximum dimension and spacing in the range of 50 to 100 Angstroms with an aerial coverage of 60% to 80%.

4. The invention in accordance with claim 3, wherein the mass distribution of agglomerated particles in said hole does not have an irregularity greater than about 25%.

5. The invention in accordance with claim 3, wherein the diameter and spacing of said agglomerated particles are no greater than 500 Angstroms.

6. The invention in accordance with claim 5, wherein said agglomerated particles range in diameter from 100 to 350 Angstroms.

7. The invention in accordance with claim 1 or 2, wherein said reflective layer is gold.

8. The invention in accordance with claim 1 or 2, wherein the characteristics of said film are such that the size and distribution of said agglomerated particles does not significantly change as a function of laser beam power at a constant pulse length.

9. The invention in accordance with claim 1 or 2, wherein the characteristics of said medium are such that said hole forming mechanism is representable by a plot of $R = R_{13} + AR$ versus $1/P$ where $R_{13}$ is the unrecorded reflectance, $AR$ is the change in reflectance produced by a written hole, and $P$ is the power of said writing beam, said plot being essentially a straight line.

10. The invention in accordance with claim 9, wherein the R intercept is indicative of the maximum reflectance change obtainable in a written hole, and the $R = R_{13}$ intercept is indicative of the threshold power required to initiate said hole forming mechanism.

11. The invention in accordance with claim 1 or 2, wherein said threshold temperature ranges from 300° C. to 600° C.

* * * * *